(12) United States Patent
Braunstein

(10) Patent No.: US 8,489,320 B2
(45) Date of Patent: Jul. 16, 2013

(54) SYSTEM AND METHOD FOR DEFINING DIRECTIONS

(75) Inventor: Andrew Scott Braunstein, Weston, MA (US)

(73) Assignee: Healthwyse, LLC, Wilmington, MA (US)

( * ) Notice: Subject to any disclaimer, the term of this patent is extended or adjusted under 35 U.S.C. 154(b) by 625 days.

(21) Appl. No.: 12/621,064

(22) Filed: Nov. 18, 2009

(65) Prior Publication Data

US 2011/0118970 A1     May 19, 2011

(51) Int. Cl.
*G01C 21/00*     (2006.01)
(52) U.S. Cl.
USPC ........... 701/400; 701/410; 701/527; 701/533; 340/993

(58) Field of Classification Search
USPC ............... 701/400, 408, 409, 410, 420, 450, 701/527, 533; 340/993, 995.19
See application file for complete search history.

(56) References Cited

U.S. PATENT DOCUMENTS

2008/0147314 A1* 6/2008 Cubillo ............... 701/207
2009/0292462 A1* 11/2009 Babetski ............. 701/201

* cited by examiner

*Primary Examiner* — Gertrude Arthur Jeanglaude
(74) *Attorney, Agent, or Firm* — Brian Colandreo; Michael T. Abramson; Holland & Knight LLP

(57) ABSTRACT

A method and computer program product for defining a plurality of addresses. Driving directions between each of the plurality of addresses are defined, thus generating a plurality of driving directions. The plurality of driving directions are stored on a client electronic device.

16 Claims, 4 Drawing Sheets

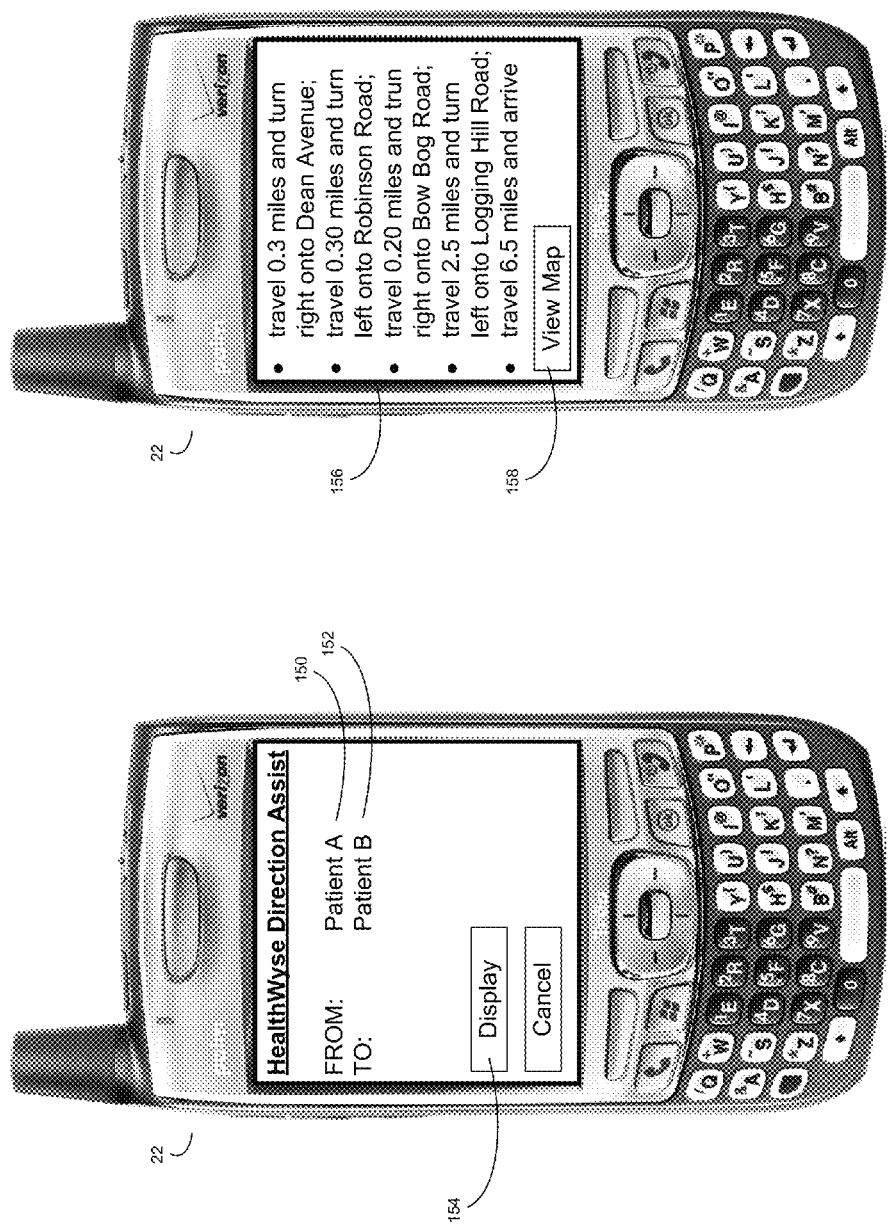

SYSTEM AND METHOD FOR DEFINING DIRECTIONS

TECHNICAL FIELD

This disclosure relates to directions and, more particularly, to the generation of directions between various client addresses.

BACKGROUND

Service providers often need to travel from one location to another location in order to provide service to their various clients. For example, home health care providers may visit multiple patients during the course of a single day and may visit different groups of patients on any given day. Additionally, for various reasons (e.g., provider availability or patient availability), the time at which the home health care provider visits a patient may vary from day to day.

Accordingly, the home health care provider may find themselves traveling between patient's homes in a sequence that they are not familiar with. Accordingly, while they may know how to get from the home of Patient A to the home of Patient B to the home of Patient C, the home health care provider may not know how to get from the home of Patient A to the home of Patient C. While there exist devices (e.g., GPS navigation systems) that direct a user from a first address to a second address, these devices tend to be costly.

SUMMARY OF DISCLOSURE

In one implementation of this disclosure, a computer-implemented method includes defining a plurality of addresses. Driving directions between each of the plurality of addresses are defined, thus generating a plurality of driving directions. The plurality of driving directions are stored on a client electronic device.

One or more of the following features may be included. Defining driving directions may include interfacing with a remote direction service to obtain the driving directions. The driving directions may include one or more maps. The driving directions may include bidirectional driving directions. The plurality of addresses may be indicative of a plurality of clients. The plurality of addresses may be chosen from a client database. Defining a plurality of addresses may include defining a plurality of addresses on a device coupled to the internet. The client electronic device may be chosen from the group consisting of a personal digital assistant, a cellular telephone, and a laptop computer.

In another implementation of this disclosure, a computer program product resides on a computer readable medium and has a plurality of instructions stored on it. When executed by a processor, the instructions cause the processor to perform operations including defining a plurality of addresses. Driving directions between each of the plurality of addresses are defined, thus generating a plurality of driving directions. The plurality of driving directions are stored on a client electronic device.

One or more of the following features may be included. Defining driving directions may include interfacing with a remote direction service to obtain the driving directions. The driving directions may include one or more maps. The driving directions may include bidirectional driving directions. The plurality of addresses may be indicative of a plurality of clients. The plurality of addresses may be chosen from a client database. Defining a plurality of addresses may include defining a plurality of addresses on a device coupled to the internet. The client electronic device may be chosen from the group consisting of a personal digital assistant, a cellular telephone, and a laptop computer.

In another implementation of this disclosure, a computer-implemented method includes defining a plurality of addresses indicative of a plurality of clients, wherein the plurality of addresses is chosen from a client database. Bidirectional driving directions between each of the plurality of addresses are defined, thus generating a plurality of bidirectional driving directions, The plurality of bidirectional driving directions are stored on a client electronic device.

One or more of the following features may be included. Defining bidirectional driving directions may include interfacing with a remote direction service to obtain the driving directions. The bidirectional driving directions may include one or more maps. The client electronic device may be chosen from the group consisting of: a personal digital assistant, a cellular telephone, and a laptop computer.

The details of one or more implementations are set forth in the accompanying drawings and the description below. Other features and advantages will become apparent from the description, the drawings, and the claims.

BRIEF DESCRIPTION OF THE DRAWINGS

FIGS. 3-5 are a diagrammatic views a personal digital assistant configured to utilize the direction generation process of FIG. 1.

DETAILED DESCRIPTION OF THE PREFERRED EMBODIMENTS

System Overview

Figure 1:
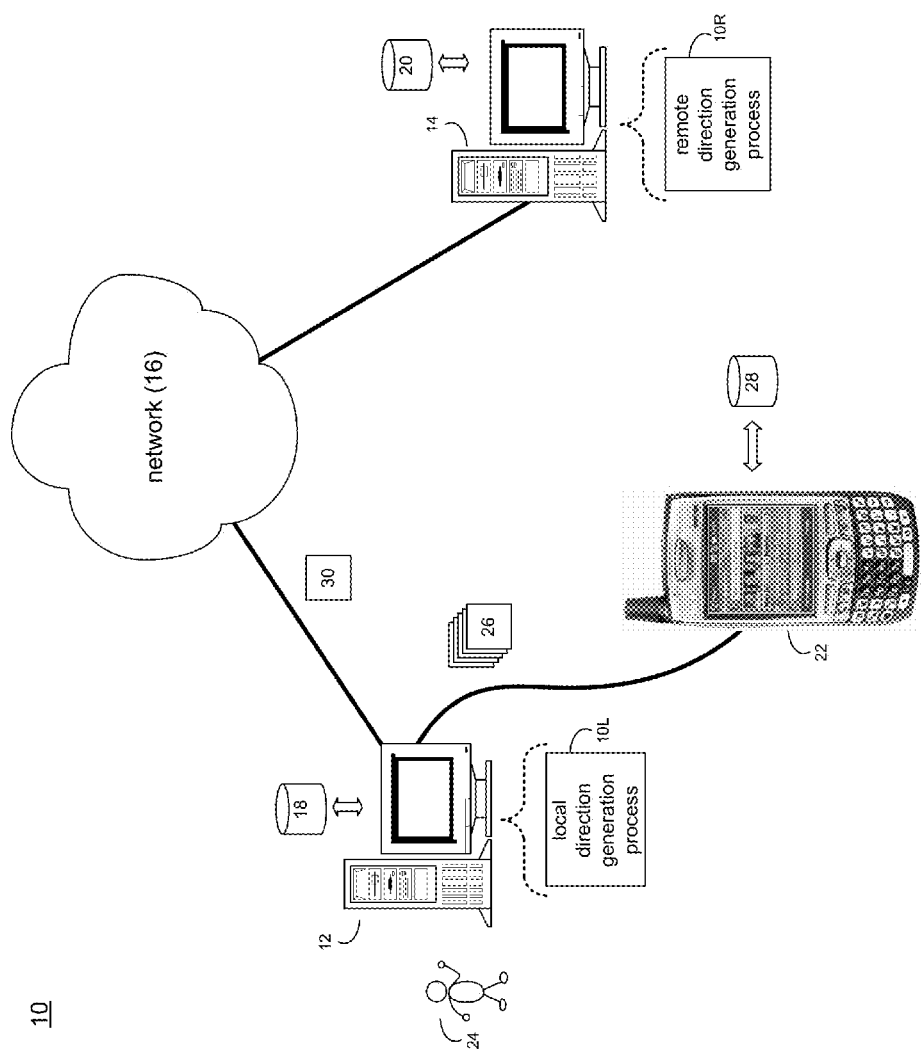
FIG. 1 is a diagrammatic view of a direction generation process executed in whole or in part by a computer coupled to a distributed computing network.
Figure 2:
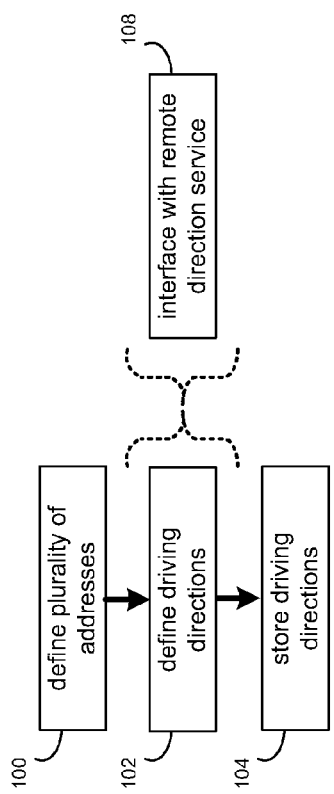
FIG. 2 is a flowchart of the direction generation process of FIG. 1.

Referring to FIGS. 1 & 2, there is shown direction generation process 10. Direction generation process 10 may be a client-side direction generation process (as represented by local direction generation process 10L), a server-side direction generation process (as represented by remote direction generation process 10R), or a hybrid client-side/server-side direction generation process (as represented by the combination of local direction generation process 10L and remote direction generation process 10R). Accordingly and for the following discussion, the direction generation process will be described generally as direction generation process 10, with the understanding that direction generation process 10 may include local direction generation process 10L and/or remote direction generation process 10R.

Local direction generation process 10C may be executed by (in whole or in part) by local computer 12 (e.g., a personal computer, a laptop computer, or a notebook computer). Remote direction generation process 10R may be executed by (in whole or in part) by remote computer 14 (e.g., a single server computer, a plurality of server computers, or a general purpose computer, for example).

As will be discussed below in greater detail, direction generation process 10 may define 100 a plurality of addresses. Direction generation process 10 may define 102 driving directions between each of the plurality of addresses, thus generating a plurality of driving directions. Direction generation process 10 may store the plurality of driving directions on a client electronic device.

Local computer 12 may be coupled to network 16 (e.g., the Internet, an intranet, a local area network, a wide area network, and/or an extranet). Remote computer 14, which may also be coupled to network 16, may be e.g., a web server running a network operating system, examples of which may include but are not limited to Microsoft Windows Server™, or Redhat Linux™. Remote computer 14 may also execute a web server application, examples of which may include but are not limited to Microsoft IIS™, or Apache Webserver™, that allows for remote access to remote computer 14 via network 16.

The instruction sets and subroutines of local direction generation process 10L, which may be stored on a storage device 18 coupled to local computer 12, may be executed by one or more processors (not shown) and one or more memory architectures (not shown) incorporated into local computer 12. Storage device 18 may include but is not limited to a hard disk drive, a tape drive, an optical drive, a RAID array, a random access memory (RAM), a read-only memory (ROM), or other form of persistent memory.

The instruction sets and subroutines of remote direction generation process 10R, which may be stored on a storage device 20 coupled to remote computer 14, may be executed by one or more processors (not shown) and one or more memory architectures (not shown) incorporated into remote computer 14. Storage device 20 may include but is not limited to a hard disk drive, a tape drive, an optical drive, a RAID array, a random access memory (RAM), a read-only memory (ROM), or other form of persistent memory.

While local computer 12 is shown hardwired to network 16, this is for illustrative purposes only and is not intended to be a limitation of this disclosure, as other configurations are possible and are considered to be within the scope of this disclosure. For example, local computer 12 may be wirelessly coupled to network 16 via e.g., a wireless communication channel established between local computer 12 and a wireless access point (not shown), which may be directly coupled to network 16.

The above-described wireless access point may be, for example, an IEEE 802.11a, 802.11b, 802.11g, 802.11n, Wi-Fi, and/or Bluetooth device that is capable of establishing a wireless communication channel between local computer 12 and the above-described wireless access point.

As is known in the art, all of the IEEE 802.11x specifications use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic device 22 (e.g., a personal digital assistant, a data-enabled cellular telephone (not shown), a laptop computer (not shown), a notebook computer (not shown), or a dedicated client electronic device (not shown)) may be releasably coupled to local computer 12. The releasable coupling of client electronic device 22 and local computer 12 may be accomplished via e.g., a USB connection, a serial data connection, a parallel data connection, an Ethernet connection, a wireless connection (e.g., an IEEE 802.11a, 802.11b, 802.11g, 802.11n, Wi-Fi, and/or Bluetooth connection).

The Direction Generation Process:

As discussed above, direction generation process 10 may define 100 a plurality of addresses. Driving directions between each of the plurality of addresses may be defined 102 by direction generation process 10, thus generating a plurality of driving directions. The plurality of driving directions may be stored 104 on a client electronic device.

Specifically, assume for illustrative purposes that user 24 is a visiting nurse that works for a nursing service (not shown) and provides home nursing care for a group of patients. Unfortunately, when user 24 receives her daily assignments, the times and the order in which she visits her patients may vary greatly from day-to-day. Accordingly, on one day, she may need to travel from Patient A to Patient B and then to Patient C. And on another day, she may need to travel from Patient C to Patient E and then to Patient A. This may result in complications if (for example), user 24 does not know how to get from Patient E to Patient A. Accordingly, while user 24 may know how to get from e.g., Patient A to Patient B and then to Patient C, user 24 may not know who to get from Patient A to Patient C directly. Or from Patient C back to Patient A.

Accordingly, direction generation process 10 (which as discussed may include any combination of remote direction generation process 10R and local direction generation process 10L) may allow for the definition 100 of a plurality of addresses. These addresses may include (in this example) the address of any patient that user 24 may need to visit. Accordingly, if user 24 has fifty weekly patients, twenty monthly patients, and ten quarterly patients, the plurality of addresses defined may include eighty addresses (i.e., representative of the fifty weekly patients, twenty monthly patients, and ten quarterly patients). This plurality of addresses may be defined 100 by user 24 directly or by the employer of user 24 (e.g., the above-referenced nursing service). For example, the plurality of addresses may be chosen from a client database, such as a client database maintained by user 24 (e.g., on storage device 18 coupled to local computer 12 and/or on storage device 20 coupled to remote computer 14) or the above-described nursing service (e.g., on storage device 18 coupled to local computer 12 and/or on storage device 20 coupled to remote computer 14).

Once the plurality of addresses are defined 100 by direction generation process 10, direction generation process 10 may define 102 driving directions between each of the plurality of addresses, thus generating plurality of driving directions 26. For example, if the plurality of addresses include five addresses (e.g., the addresses of Patient A, Patient B, Patient C, Patient D & Patient E), direction generation process may define the following direction sets:

| | | | | |
|---|---|---|---|---|
| For Patient A | A → B | A → C | A → D | A → E |
| For Patient B | B → A | B → C | B → D | B → E |
| For Patient C | C → A | C → B | C → D | C → E |
| For Patient D | D → A | D → B | D → C | D → E |
| For Patient E | E → A | E → B | E → C | E → D |

Accordingly, the driving directions 26 defined 102 by direction generation process 10 may be bidirectional directions that allow user 24 to travel between any of their patients. Depending on the manner in which direction generation process 10 is configured, driving directions 26 may include one or more maps. For example, turn-by-turn maps may be included within each direction set included within driving directions 26. Alternatively, a starting point map and an ending point map may be included within each direction set included within driving directions 26. Alternatively still, no maps may be included within each directions set included within driving directions 26.

Once driving directions 26 between each of the plurality of addresses are defined 102 by direction generation process 10, driving directions 26 may be stored 104 on client electronic device 22. As discussed above, client electronic device 22 may be releasably coupled to local computer 12. Accordingly, local computer 12 may provide driving directions 26 to client electronic device 22 via the above-described connection (e.g., a USB connection, a serial data connection, a parallel data connection, an Ethernet connection, or a wireless connection). Once driving directions 26 are received by client electronic device 22, client electronic device 22 may store driving directions 26 on storage device 28 coupled to client electronic device 22. Examples of storage device 28 may include but are not limited to a hard disk drive, a random access memory (RAM), a read-only memory (ROM), a flash memory device, or other form of persistent memory.

As stated above, the above-described client database may be maintained by user 24 (e.g., on storage device 18 coupled to local computer 12 and/or on storage device 20 coupled to remote computer 14) or the above-described nursing service (e.g., on storage device 18 coupled to local computer 12 and/or on storage device 20 coupled to remote computer 14). Additionally, client electronic device 22 may maintain a local copy of the above-described database on storage device 28 coupled to client electronic device 22. Direction generation process 10 may be configured to replicate information between these databases. Accordingly, changes made to the database maintained on client electronic device 22 may be replicated on e.g., the database maintained on local computer 12 and/or remote computer 14. Conversely, changes made to the database maintained on local computer 12 and/or remote computer 14 may be replicated on the database maintained on client electronic device 22.

As discussed above, direction generation process 10 may be a client-side direction generation process (as represented by local direction generation process 10L), a server-side direction generation process (as represented by remote direction generation process 10R), or a hybrid client-side/server-side process (as represented by the combination of local direction generation process 10L and remote direction generation process 10R). The server-side process (as represented by remote direction generation process 10R) utilized by direction generation process 10 may include (or be a portion of) a remote direction service maintained and operated by a third-party (such as e.g., Google Maps™ or Mapquest™). Accordingly, when such a remote direction service is utilized, when direction generation process 10 defines 102 driving directions 26, direction generation process 10 may interface 108 with the above-described remote direction service to obtain driving directions 26. Therefore, local direction generation process 10L may first define list 30 of needed directions, interface 108 with remote direction generation process 10R, and provide remote direction generation process 10R with list 30. Remote direction generation process 10R may then process list 30, define the driving directions (e.g., driving directions 26) identified within list 30 and provide driving directions 26 to local direction generation process 10L.

Figure 5:
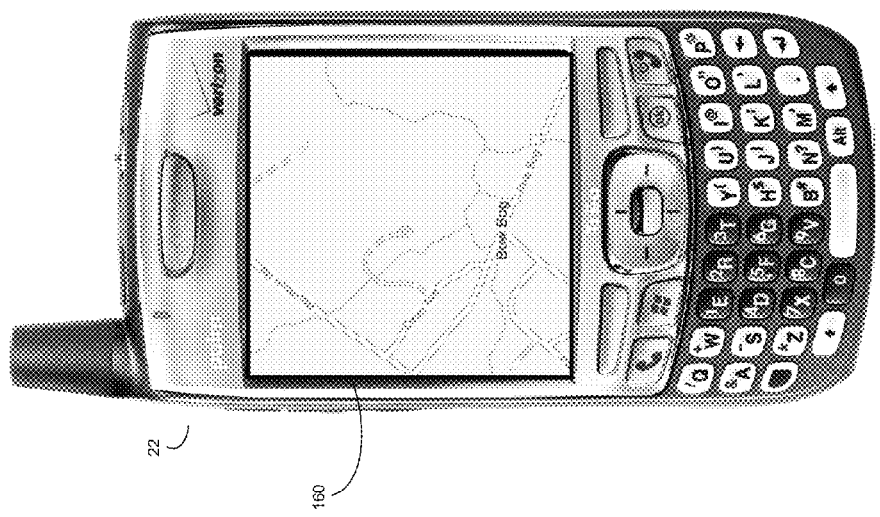

As discussed above, once driving directions 26 between each of the plurality of addresses are defined 102 by direction generation process 10, driving directions 26 may be stored 104 on client electronic device 22. Referring also to FIGS. 3-5, when user 24 needs a specific direction set, user 24 may select the starting address 150 (e.g., the address of Patient A), the ending address 152 (e.g., the address of Patient B), and the select "Display" button 154. Client electronic device 22 may than obtain the appropriate direction set (i.e., direction set 156) from driving directions 26 stored on storage device 28 and display the same on the display screen of client electronic device 22. As discussed above, driving directions 26 may include one or more maps. Accordingly, if maps are included within driving directions 26, user 22 may select "View Map" button 158 to display the maps associated with direction set 156.

Additionally functionality may be included within direction generation process 10. For example, client electronic device 22 in combination with direction generation process 10 may be configured to allow user 24 to confirm their arrival at a particular address. For example, client electronic device 22 in combination with direction generation process 10 may be configured to allow for the scanning of a bar code resident at a particular address (thus confirming their arrival at the address). Additionally/alternatively, client electronic device 22 may include a GPS chipset (not shown) that may be accessed by direction generation process 10 to confirm that arrival of user 24 at a particular address (that has a defined GPS location). Additionally/alternatively, client electronic device 22 in combination with direction generation process 10 may be configured to allow for the reading of an RFID (i.e., Radio Frequency ID) tag resident at a particular address (thus confirming their arrival at the address). The preceding examples are for illustrative purposes only and are not intended to be a limitation of this disclosure, as other configurations are possible.

Further, being that client electronic device 22 in combination with direction generation process 10 may be configured to allow user 24 to confirm their arrival at a particular address, the distance travelled by user 24 may be monitored. Accordingly, if direction generation process 10 can verify that user 24 visited Patient A, then drove to Patient B, then drove to Patient C, user 24 may be entitled to reimbursement for mileage travelled from their place of business to Patient A, from Patient A to Patient B, from Patient B to Patient C, and from Patient C to their place of business. Accordingly, as client electronic device 22 in combination with direction generation process 10 may allow user 24 to verify their arrival at all of these locations, direction generation process 10 may be configured automatically keep track to the total distance travelled by user 24 (for reimbursement purposes). Additionally, direction generation process 10 may be configured to automate the generation of the paperwork that user 24 is required to submit for reimbursement of travel expenses. Additionally/alternatively, direction generation process 10 may be configured to electronically submit the information required for user 24 to be reimbursed for their travel expenses.

A number of implementations have been described. Nevertheless, it will be understood that various modifications may be made. Accordingly, other implementations are within the scope of the following claims.

What is claimed is:

1. A computer-implemented method comprising:
   defining a plurality of addresses that include a plurality of starting addresses and a plurality of ending addresses, wherein at least a portion of the plurality of addresses is indicative of a plurality of clients, wherein at least a portion of the plurality of clients includes one or more patients, and wherein at least a portion of the plurality of addresses is chosen from a client database;
   defining driving directions between each of the plurality of addresses, thus generating a plurality of driving directions; and
   storing the plurality of driving directions on a client electronic device.

2. The computer-implemented method of claim 1 wherein defining driving directions include:

interfacing with a remote direction service to obtain the plurality of driving directions.

3. The computer-implemented method of claim 1 wherein the plurality of driving directions includes one or more maps.

4. The computer-implemented method of claim 1 wherein the plurality of driving directions includes bidirectional driving directions.

5. The computer-implemented method of claim 1 wherein defining the plurality of addresses includes:
   defining the plurality of addresses on a device coupled to the internet.

6. The computer-implemented method of claim 1 wherein the client electronic device includes at least one of a personal digital assistant, a cellular telephone, and a laptop computer.

7. A computer program product residing on a computer readable medium having a plurality of instructions stored thereon that, when executed by a processor, cause the processor to perform operations comprising:
   defining a plurality of addresses that include a plurality of starting addresses and a plurality of ending addresses, wherein at least a portion of the plurality of addresses is indicative of a plurality of clients, wherein at least a portion of the plurality of clients includes one or more patients, and wherein at least a portion of the plurality of addresses is chosen from a client database;
   defining driving directions between each of the plurality of addresses, thus generating a plurality of driving directions; and
   storing the plurality of bidirectional driving directions on a client electronic device.

8. The computer program product of claim 7 wherein the instructions for defining driving directions include instructions for:
   interfacing with a remote direction service to obtain the plurality of driving directions.

9. The computer program product of claim 7 wherein the plurality of driving directions includes one or more maps.

10. The computer program product of claim 7 wherein the plurality of driving directions includes bidirectional driving directions.

11. The computer program product of claim 7 wherein the instructions for defining the plurality of addresses include instructions for:
    defining the plurality of addresses on a device coupled to the internet.

12. The computer program product of claim 7 wherein the client electronic device includes at least one of a personal digital assistant, a cellular telephone, and a laptop computer.

13. A computer-implemented method comprising:
    defining a plurality of addresses indicative of a plurality of clients that include a plurality of starting addresses and a plurality of ending addresses, wherein at least a portion of the plurality of addresses is indicative of a plurality of clients, wherein at least a portion of the plurality of clients includes one or more patients, and wherein at least a portion of the plurality of addresses is chosen from a client database;
    defining bidirectional driving directions between each of the plurality of addresses, thus generating a plurality of bidirectional driving directions; and
    storing the plurality of bidirectional driving directions on a client electronic device.

14. The computer-implemented method of claim 13 wherein defining bidirectional driving directions include:
    interfacing with a remote direction service to obtain the plurality of bidirectional driving directions.

15. The computer-implemented method of claim 13 wherein the plurality of bidirectional driving directions includes one or more maps.

16. The computer-implemented method of claim 13 wherein the client electronic device includes at least one of a personal digital assistant, a cellular telephone, and a laptop computer.

* * * * *